(12) United States Patent
Yoda et al.

(10) Patent No.: US 8,084,991 B2
(45) Date of Patent: Dec. 27, 2011

(54) POWER RECEPTION DEVICE, ELECTRONIC APPARATUS, AND NON-CONTACT POWER TRANSMISSION SYSTEM

(75) Inventors: Kentaro Yoda, Chino (JP); Hirofumi Okada, Suwa (JP); Takahiro Kamijo, Fujimi (JP)

(73) Assignee: Seiko Epson Corporation, Tokyo (JP)

( * ) Notice: Subject to any disclaimer, the term of this patent is extended or adjusted under 35 U.S.C. 154(b) by 420 days.

(21) Appl. No.: 12/434,097

(22) Filed: May 1, 2009

(65) Prior Publication Data

US 2009/0278666 A1 Nov. 12, 2009

(30) Foreign Application Priority Data

May 9, 2008 (JP) ................................. 2008-123549

(51) Int. Cl.
H01M 6/50 (2006.01)

(52) U.S. Cl. ....................................... 320/108; 455/573

(58) Field of Classification Search .................. 320/109, 320/108, 115; 455/573
See application file for complete search history.

(56) References Cited

U.S. PATENT DOCUMENTS 5,512,810 A * 4/1996 Hansen et al. ................ 318/800
8,000,800 B2 * 8/2011 Takeda et al. ................... 607/61

FOREIGN PATENT DOCUMENTS

| JP | A-11-164497 | 6/1999 |
| JP | A-2006-060909 | 3/2006 |

* cited by examiner

*Primary Examiner* — Shawn Riley
(74) *Attorney, Agent, or Firm* — Oliff & Berridge, PLC

(57) ABSTRACT

A power reception device includes a first resistance element having one end electrically connected to one end of a secondary coil which is able to be electromagnetically coupled to a primary coil of a power transmission devices a second resistance element having one end electrically connected to the other end of the first resistance element and having the other end supplied with a reference voltage, a power reception control device that obtains a frequency of an alternating current (AC) voltage induced on the secondary coil based on a voltage division signal output from the other end of the first resistance element and varies a magnitude of a load of the power reception device in accordance with the frequency, and a variable resistance element that has resistance varied in accordance with temperature and is connected to the first resistance element or the second resistance element in parallel.

14 Claims, 12 Drawing Sheets

FIG. 6A    L2    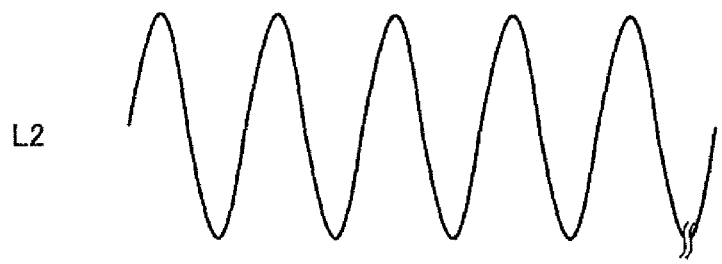
FIG. 6B    VTH CCMPI    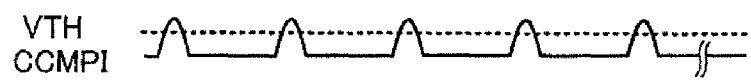
FIG. 6C    CLKSYNC    
FIG. 6D    VTH CCMPI    
FIG. 6E    CLKSYNC    

POWER RECEPTION DEVICE, ELECTRONIC APPARATUS, AND NON-CONTACT POWER TRANSMISSION SYSTEM

Japanese Patent Application No. 2008-123549 filed on May 9, 2008, is hereby incorporated by reference in its entirety.

BACKGROUND

1. Technical Field

The present invention relates to a power reception device, an electronic apparatus, and a non-contact power transmission system.

2. Related Art

In resent years, a non-contact power transmission technique has been attractive. The non-contact power transmission technique makes it possible to perform transmission of electric power by utilizing electromagnetic induction without using a metallic contact. As an application of the non-contact power transmission technique, a technique of charging a mobile phone or a home-house device (for example, a cordless handset for a telephone) has been heretofore offered.

JP-A-2006-60909 is an example of related art and discloses a power reception device including a secondary circuit 21, a voltage division circuit 251, and a power reception control device 2521 and 28. In the description, transmission of data to a power transmission device (primary side) from a power reception device (secondary side) is achieved by so-called a load modulation process. The power transmission device detects an induced voltage of a primary coil by means of a comparator so that it detects variation of a load condition of the power reception device (secondary side) due to interposition of a foreign object or transmission of data.

JP-A-11-164497 is another example of related art and discloses a protection circuit for preventing excessive heating of a secondary coil and an element in a power reception device due to an abnormality. The protection circuit includes, for example, a temperature sensor 8, a detection circuit 9 for detecting abnormal temperature, and a mechanical relay switch circuitry connected to both ends of secondary coil. It is preferable, in general, that an electronic apparatus or a circuit built therein (for example, a power reception device) has a simple structure. However, it is hard for a person skilled in the art to design a circuit having a simple structure.

SUMMARY

An advantage of the present invention is to provide a power reception device, an electronic apparatus and a non-contact power transmission system each having a simple structure.

A power reception device according to a first aspect of the invention includes a secondary coil capable of being electromagnetically coupled to a primary coil of a power transmission device, a voltage division circuit that has a first resistance element and a second resistance element serially connected to each other and is provided between one end of the secondary coil and a reference voltage wire connected to the second resistance element, a variable resistance element that is connected to the first resistance element or the second resistance element in parallel and has a resistance capable of being varied in accordance with temperature of the variable resistance element, and a power reception control device that receives a voltage division signal from the voltage division circuit, obtains a frequency of an alternating current (AC) induction voltage of the secondary coil based on the voltage division signal and varies a magnitude of a load of the power reception device in accordance with the frequency. The power reception device according to the invention may be achieved by adding a variable resistance element to a structure described in the example of related art. As a result, the power reception device according to the invention has a simple structure.

In the power reception device according to the invention, the variable resistance element may have a negative temperature coefficient. The more the temperature of the variable resistance element increases, the more the resistance of the variable resistance element decreases. The variable resistance element may be connected to the second resistance element in parallel.

In the power reception device according to the invention, the variable resistance element may have a positive temperature coefficient. The more the temperature of the variable resistance element increases, the more the resistance of the variable resistance element increases. The variable resistance element may be connected to the first resistance element in parallel.

The power reception control device according to the invention may have a comparator circuit that compares a voltage of the voltage division signal with a given threshold voltage. The comparator circuit may generate a synchronous clock in synchronism with the frequency such that the synchronous clock presents a high level while the voltage of the voltage division signal is higher than the given threshold voltage and presents a low level while the voltage of the voltage division signal is lower than the given threshold voltage. The power reception control device may vary the magnitude of the power reception device in accordance with the magnitude of the load.

In the power reception device according to the invention, the synchronous clock may always present a low level while the temperature of the variable resistance element is higher than a given temperature. The power reception control device may not always vary a load of the power reception device.

In the power reception device according to the invention, when the synchronous clock always present a low level, the power reception control device may stop supplying of power to a load of the power reception device.

In the power reception device according to the invention, a load of the power reception device may include a battery, and a charge control device that controls charging of the battery. The power reception device may transmit a stop signal for stopping control of charging of the battery to the charge control device when the synchronous clock always presents a low level.

The power reception device according to the invention may further include a mechanical relay switch circuit provided between one and the other ends of the secondary coil. The power reception control device may control the mechanical relay switch circuit so as to make a short circuit between one and the other ends of the secondary coil after the power reception control device stops supplying of power to a load of the power reception device or transmits the signal to the charge control device.

The power reception device according to the invention may further include a fuse element provided between the secondary coil and a load of the power reception device.

The power reception device according to the invention, may further include a rectification circuit that converts an AC induction voltage of the secondary coil to a direct current (DC) voltage, and has a first input terminal, second input terminal, a first output terminal and a second output terminal. The first input terminal may be connected to one end of the secondary coil, the second input terminal may be connected to the other end of the secondary coil, and the second output terminal may be connected to the reference voltage wire. A difference between a potential of the first output terminal and a potential of the second output terminal may present a potential of the DC voltage.

The power reception device according to the invention may further include a load modulation section having a load modulation resistance element and a switching element which are serially connected to each other. The power reception control device may vary a size of a load of the power reception device by turning on or off the switching element.

An electronic apparatus according to a second aspect of the invention includes the power reception device according to the first aspect of the invention.

A non-contact power transmission system according to a third aspect of the invention, includes the power reception device according to the first aspect of the invention and the power transmission device. The power transmission device has the primary coil and a transmission control circuit that stops driving of the primary coil when it is detected that a size of a load of the reception device is not varied beyond a given range.

It would be readily understood by those skilled in the art that each of the device, the apparatus and the system according to the invention may be changed or modified without departing from the spirit and scope of the invention. For example, at least one element forming the device according to the invention may be added to another device according to the invention. Alternatively, at least one element forming the device according to the invention may be replaced with at least one element forming another device according to the invention.

BRIEF DESCRIPTION OF THE DRAWINGS

The invention will be described with reference to the accompanying drawings, wherein like numbers reference like elements.

FIG. 6A is a graph showing a waveform of a signal of an AC induction voltage of a secondary coil L2.

FIG. 6B is a graph showing a waveform of a voltage division signal CCMPI.

FIG. 6C is a graph showing a waveform of a signal of a synchronous clock CLKSYNK.

FIG. 6D is a graph showing a waveform of the voltage division signal CCMPI based on a variable resistance element 32 in an abnormal temperature condition.

FIG. 6E is a graph showing a waveform of a signal of the synchronous clock CLKSYNK based on the variable resistance element 32 in an abnormal temperature.

DESCRIPTION OF EXEMPLARY EMBODIMENTS

Preferable embodiments of the invention will be explained with reference to the accompanying drawings.

It should be noted that embodiments described below do not limit the spirit or scope of the invention defined by the appended claims and all the structures described below are not necessarily needed to practice the invention.

1. Electronic Apparatus

Figure 1A:
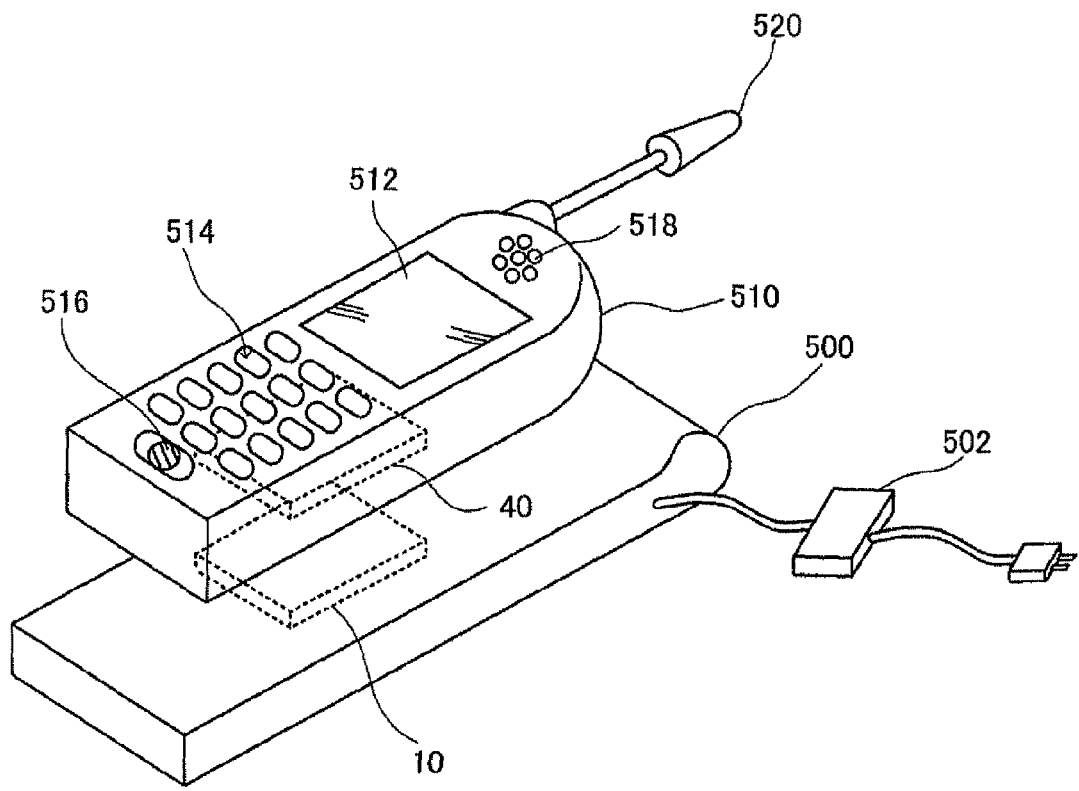
FIGS. 1A and 1B are schematic views illustrating a non-contact power transmission system according to the invention.

FIG. 1A shows an electronic apparatus applied with a non-contact power transmission system of an embodiment of the invention. A charging device (cradle) 500 of an electronic apparatus is equipped with a power transmission device 10. A mobile phone 510 of an electronic apparatus is equipped with a power reception device 40. The mobile phone 510 includes a display section 512 such as a liquid crystal display device (LCD), an operation section 514 having a button, a microphone (sound input section) 516, a speaker (sound output section) 518, and an antenna 520.

Electric power is supplied to the charging device via an AC adapter 502, and the power is transmitted to the power reception device 40 from the power transmission device 10 in a non-contact manner. With the above configuration, a battery in the mobile phone 510 can be charged or a device in the mobile phone can be operated.

An electronic apparatus to which the embodiment can be applied, is not limited to the mobile phone 510. The embodiment can be applied to various kinds of electronic apparatuses such as, for example, a wrist watch, a codeless phone, a shaver, an electric toothbrush, a wrist computer, a handy terminal device, a mobile information terminal device, an electric vehicle, and an IC card.

Figure 1B:
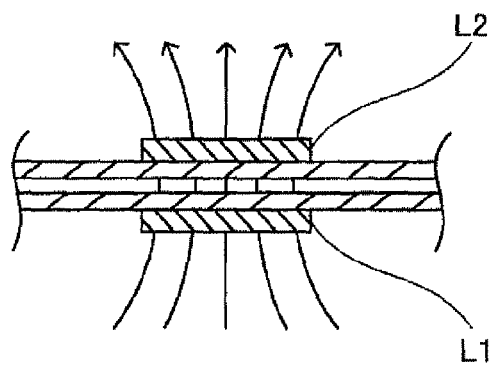

As typically shown in FIG. 1B, the transmission of electric power to the reception device 40 from the power transmission device 10 is achieved such that a primary coil (power transmission coil) L1 provided to the power transmission device 10 and a secondary coil (power reception coil) L2 are electromagnetically coupled to each other to form a power transmission transformer. With the above configuration, the transmission of electric power in a non-contact manner can be carried out.

2. Power Transmission Device and Power Reception Device

Figure 2:
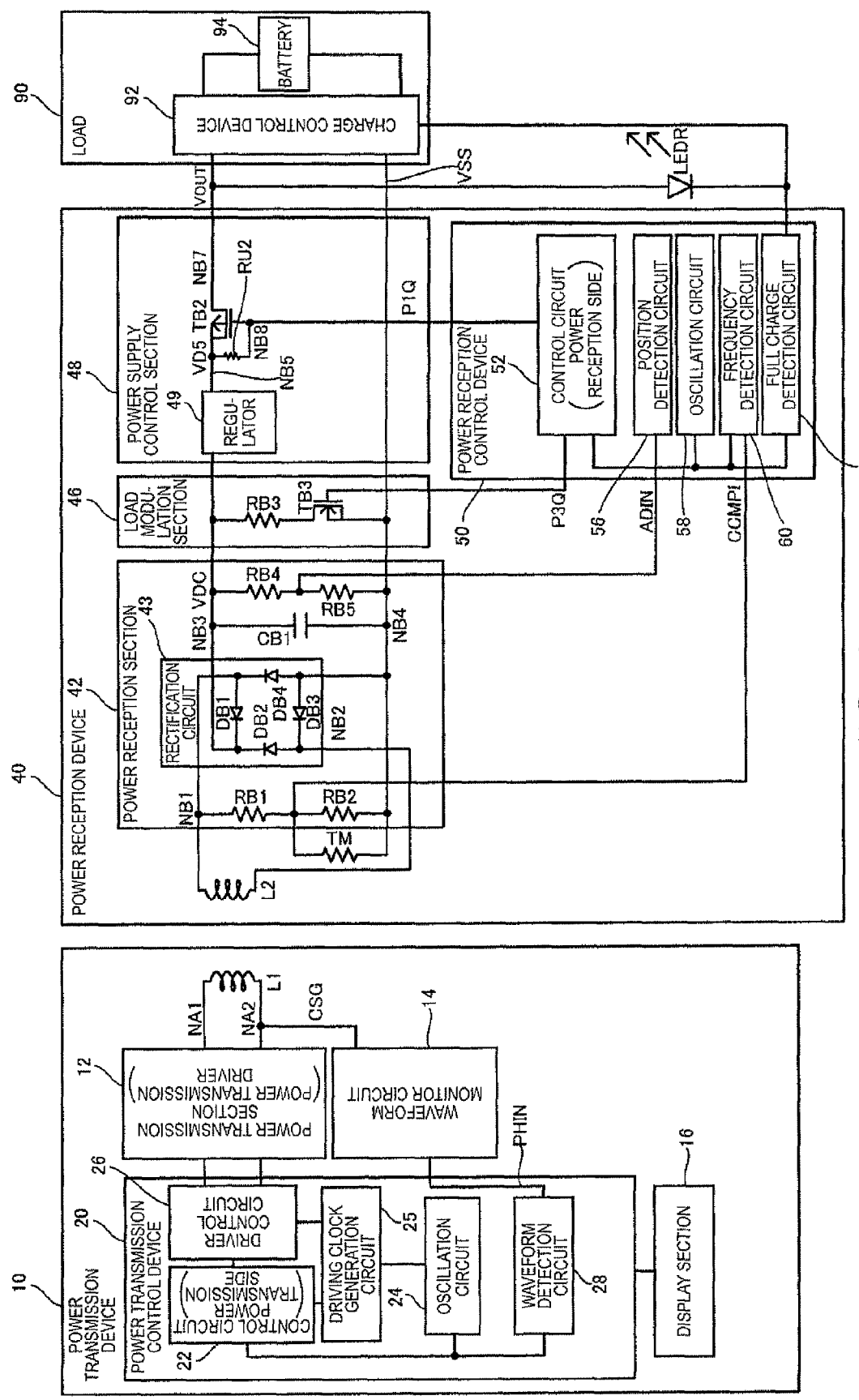
FIG. 2 is a block diagram showing exemplary structures of a power transmission device, a power transmission control device, a power reception device and a power reception control device according to an embodiment of the invention.

FIG. 2 shows exemplary structures of the power transmission device 10, a power transmission control device 20, the power reception device 40 and a power reception control device 50 in the embodiment.

The electronic apparatus at the power transmission side, such as the charging device 500 shown in FIG. 1A includes the power transmission device 10 shown in FIG. 2. The electronic apparatus at the power reception side, such as the mobile phone 510 shown includes the power reception device 40 and a load (real load) 90. A non-contact power transmission system is realized by a structure shown in FIG. 2. The power transmission system supplies electric power (voltage VOUT) to the load 90 from a voltage output node NB7 of the power reception device 40 such that the primary coil L1 of, for example, a flat coil and the secondary coil L2 are electromagnetically coupled and the electric power is transmitted to the power reception device 40 from the power transmission device 10.

The power transmission device (transmission module, primary module) 10 may include the primary coil L1, a power transmission section 12, a waveform monitor circuit 14, a display section 16 and a transmission control device 20. A structure of the power transmission device 10 or the power transmission control device 20 is not limited to that shown in FIG. 2. Various modifications can be made to the structure such that a part of the structural elements (for example, the display section or the waveform monitor circuit) may be omitted, another structural element may be added, or a connection relationship may be changed.

Figure 3A:
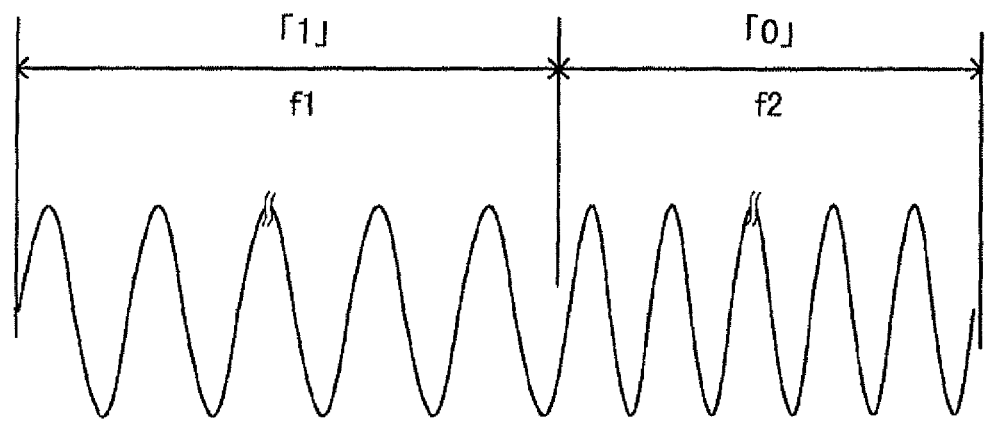
FIGS. 3A and 3B are characteristic graphs showing a method of data transmission by frequency modulation and load modulation.

The power transmission section 12 generates an AC voltage having a predetermined frequency during transmission of electric power, and generates an ac voltage having a frequency varied in accordance with data during transmission of data to supply each voltage to the primary coil L1. To be specific, as shown in FIG. 3A, when, for example, data "1" is to be transmitted to the power reception device 40, the power transmission section 12 generates the AC voltage having a frequency f1. When data "0" is to be transmitted thereto, it generates the AC voltage having a frequency f2. The power transmission section 12 may include a first power transmission driver for driving one end of the primary coil L1, a second power transmission driver for driving the other end of the primary coil L1, and at least one capacitor forming a resonance circuit together with the primary coil L1.

Each of the first and second power transmission drivers provided in the power transmission section 12 is an inverter circuit (buffer circuit) configured of, for example, a power metal-oxide semiconductor (power MOS) transistor and is controlled by a driver control circuit 26 of the power transmission control device 20.

The primary coil (power transmission side coil) L1 and the secondary coil (power reception side coil) L2 are electromagnetically coupled to each other to form a power transmission transformer. When, for example, transmission of electric power is required, the mobile phone 510 is placed on the charging device 500 as shown in FIGS. 1A and 1B so as to form a condition capable of passing magnetic fluxes of the primary coil L1 through the secondary coil L2. When transmission of electric power is not needed, the charging device 500 and the mobile phone 510 are physically separated from each other so as to form a condition incapable of passing magnetic fluxes of the primary coil L1 through the secondary coil L2.

The waveform monitor circuit (rectification circuit, waveform shaping circuit) 14 generates an induction voltage signal PHIN for monitoring of a waveform in accordance with a coil end signal CSG of the primary coil L1. The coil end signal CSG of the induction voltage signal of the primary coil L1 possibly exceeds a maximum rated voltage of an IC of the power transmission control device 20 or possibly becomes a negative voltage. By receiving the coil end signal CSG, the waveform monitor circuit 14 generates an induction voltage signal PHIN for waveform monitoring to output it to, for example, a waveform monitor terminal of the power transmission control device 20. The induction voltage signal PHIN is one whose waveform can be detected by a waveform detection circuit 28 of the power transmission control device 20. The details of the waveform monitor circuit 14 will be described later.

The display section 16 displays various conditions (during the transmission of electric power, ID identification) of the non-contact power transmission system by using colors or images. The display section 16 may be configured of, for example, a light emitting diode (LED) or an LCD.

The power transmission control device 20 is adapted to perform various control processes of the power transmission device 10, and can be formed of an integrated circuit device (IC). The power transmission control device 20 may include a control circuit (transmission side) 22, an oscillation circuit 24, a driving clock generation circuit 25, the driver control circuit 26, and the waveform detection circuit 28. Note that, about the power transmission control device 20, a part of the structural elements may be omitted or another structural element may be added, thus, modifications can be made.

The control circuit (control section) 22 at the power transmission side is adapted to control the power transmission device 10 or the power transmission control device 20, and can be formed of, for example, a gate array or a microcomputer. To be specific, the control circuit 22 performs various sequence control processes or judging processes necessary for transmission of electric power, detection of a load condition (detection of data, detection of a foreign object, detection of picking, etc.) and modulation of a frequency.

The oscillation circuit 24 is formed of, for example, a quartz oscillation circuit and generates a clock at the primary side. The driving clock generation circuit 25 generates a driving clock for regulating a driving frequency. The driver control circuit 26 generates a control signal having a desired frequency in accordance with the above driving clock or a frequency setting signal from the control circuit 22 and outputs the control signal to the first and second power transmission drivers to control the first and second power transmission drivers.

The waveform detection circuit 28 detects variation of a waveform of the induction voltage signal PHIN of the primary coil L1. When, for example, the load condition (load current) at the power reception side (secondary side) is varied, the waveform of the induction voltage signal PHIN is varied. The waveform detection circuit 28 detects the variation of the waveform and outputs the detected result (detection result information) to the control circuit 22.

To be specific, the waveform detection circuit 28 performs shaping of a waveform of, for example, the induction voltage signal PHIN to generate a waveform shaped signal. The waveform detection circuit 28 generates the waveform shaped signal (pulse signal) in a square (rectangular) waveform which becomes active (e.g., "H" level) when, for example, the signal PHIN exceeds a given threshold voltage. The waveform detection circuit 28 detects pulse width information (pulse width period) of the waveform shaped signal in accordance with the waveform shaped signal and the driving clock. To be specific, the waveform detection circuit 28 receives the waveform shaped signal and the driving clock from the driving clock generation circuit 25 to detect the pulse width information of the waveform shaped signal, thereby detecting pulse width information of the induction voltage signal PHIN.

The control circuit 22 detects the load condition (fluctuation of load, magnitude of load) of the power reception side (at the power reception 40 side) based on the result detected by the waveform detection circuit 28. To be specific, the control circuit 22 detects the load condition of the power reception side based on the pulse width information detected by the waveform detection circuit 28 (pulse width detection circuit), and then the control circuit 22 performs, for example, detection of data (load), detection of a foreign object (metallic material) and detection of picking (attaching or detaching).

That is, the pulse width period which is the pulse width information of the induction voltage signal, is varied in accordance with variation of the load condition at the power reception side. The control circuit 22 detects the fluctuation of the load at the power reception side based on the pulse width period (counted value obtained by measuring the pulse width period). With the above configuration, when a load modulation section 46 of the power reception device 40 transmits data by virtue of load modulation shown in FIG. 3B, the control circuit 22 can detect the transmission data.

The power reception device 40 (power reception module, secondary module) may include the secondary coil L2, a power reception section 42, the load modulation section 46, a power supply control section 48, and a power reception control device 50. Note that, the structure of the power reception device 40 or the power reception control device 50 is not limited to that shown in FIG. 2, and a part of the structural elements may be omitted, another structural element may be added, or a connecting relationship can be changed, thus, various modifications can be made.

The power reception section 42 converts an AC induction voltage of the secondary coil L2 to a DC voltage. A rectification circuit 43 performs the above conversion. The rectification circuit 43 includes diodes DB1 to DB4. The diode DB1 is provided between a node NB1 at one end of the secondary coil L2 and a forming node NB3 of the DC voltage VDC, the diode DB2 is provided between the node NB3 and a node NB2 at the other end of the secondary coil L2, the diode DB3 is provided between the node NB2 and a node NB4 of a reference voltage VSS, and the diode DB4 is provided between the nodes NB4 and NB1.

Resistance elements RB1 and RB2 of the power reception section 42 are provided to the nodes NB1 and NB4. A signal CCMPI obtained by dividing a voltage between the nodes NB1 and NB4 by means of the resistance elements RB1 and RB2 is input to a frequency detection circuit 60 of the power reception control device 50.

A capacitor CB1 and resistance elements RB4 and RB5 of the power reception section 42 are provided between the node NB3 of the DC voltage VDC and the node NB4 of the reference voltage VSS. A signal ADIN obtained by dividing a voltage between the nodes NB3 and NB4 by means of the resistance elements RB4 and RB5 is input to a position detection circuit 56 of the power reception control device 50.

Figure 3B:
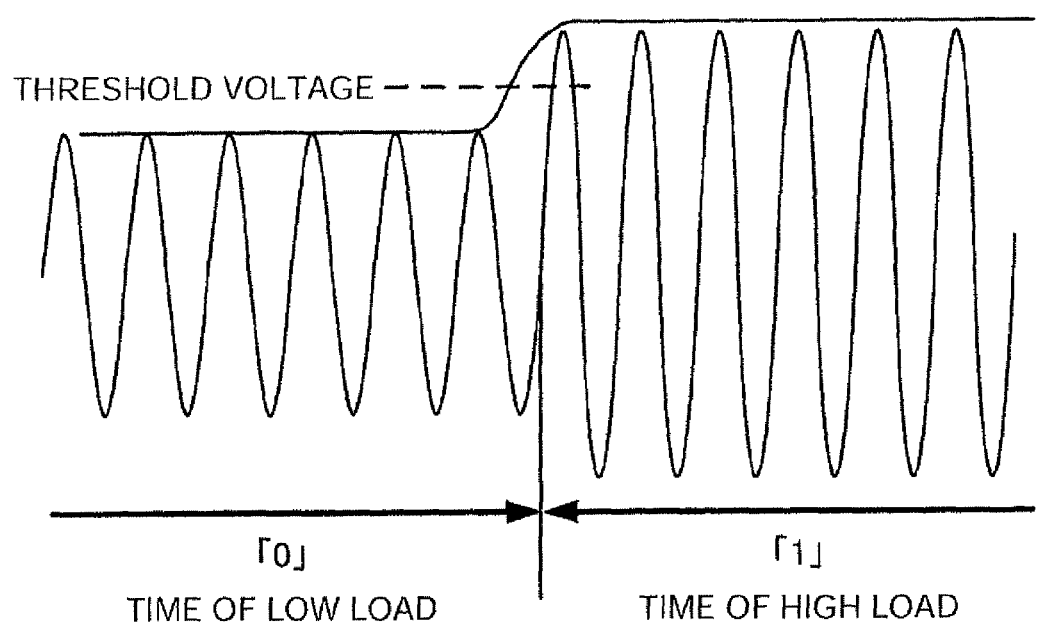

The load modulation section 46 performs a process of load modulation. To be specific, in a case where desired data is transmitted to the power transmission device 10 from the power reception device 40, the load at the load modulation section 46 (secondary side) is varied in accordance with transmission data so that a signal waveform of the induction voltage of the primary coil L1 is varied as shown in FIG. 3B. For this reason, the load modulation section 46 may include a resistance element RB3 provided between the nodes NB3 and NB4 and a transistor TB3 (N type complementary metal-oxide semiconductor (CMOS) transistor). The transistor TB3 is on-off controlled in accordance with a signal P3Q output from a control circuit 52 in the power reception control device 50. When the process of load modulation is carried out by on-off controlling the transistor TB3, a transistor TB2 in the power supply control section 48 is set in an off-state so as not to electrically connect the load 90 to the power reception device 40.

For example, in a case where the secondary side is set in a low load state (large impedance) in order to transmit data "0" as shown in FIG. 3B, the signal P3Q is set in an "L" level so that the transistor TB3 is turned off. Accordingly, the load of the load modulation section 46 becomes approximately an infinite value. On the other hand, in a case where the secondary side is set in a high load state (small impedance) in order to transmit data "1", the signal P3Q is set in an "H" level so that the transistor TB3 is turned on. Accordingly, the load of the load modulation section 46 becomes the resistance element RB3 (high load).

The power supply control section 48 controls supplying of power to the load 90. A regulator 49 adjusts a voltage level of the DC voltage VDC obtained by conversion by the rectification circuit 43 to generate a power source voltage VD5 (e.g., 5 V). The power reception control device 50 operates by being supplied with, for example, the power source voltage VD5.

The transistor TB2 (P type CMOS transistor) is controlled in accordance with a signal P1Q output from the control circuit 52 in the power reception control device 50. To be specific, the transistor TB2 is turned on when normal transmission of electric power is carried out after completion (conclusion) of authentication of an ID, and is turned off in the event of the performing of the load modulation.

The power reception control device 50 is adapted to perform various control processes of the power reception device 40 and can be formed of an integrated circuit device (IC). The power reception control device 50 can operate by being supplied with the power source voltage VD5 generated in accordance with the induction voltage of the secondary coil L2. The power reception control device 50 may include the control circuit 52 (power reception side), the position detection circuit 56, an oscillation circuit 58, the frequency detection circuit 60, and a full charge detection circuit 62.

The control circuit 52 (control section) is adapted to control the power reception device 40 or the power reception control device 50, and can be formed of, for example, a gate array or a microcomputer. To be specific, the control circuit 52 performs various sequence control processes or judging processes necessary for authentication of an ID, detection of a position, detection of a frequency, modulation of a load, or detection of full charge.

The position detection circuit 56 monitors a waveform of the signal ADIN corresponding to a waveform of the induction voltage of the secondary coil L2 to determine whether or not a positional relationship between the primary coil L1 and the secondary coil L2 is adequate. To be specific, the signal ADIN is converted to a binary value by a comparator or A/D converted, and then the level is judged, thereby determining adequacy or inadequacy of the positional relationship.

The oscillation circuit 58 is formed of, for example, a CR oscillation circuit and generates a clock at the secondary side. The frequency detection circuit 60 detects a frequency (f1 or, f2) of a signal CCMPI. As shown in FIG. 3A, the power reception control device 50 determines whether transmission data from the power transmission device 10 is "1" or "0".

The full charge detection circuit 62 (charge detection circuit) is adapted to detect whether or not a battery 94 (secondary battery) of the load 90 is in a full charged state (charged state).

The load 90 may include a charge control device 92 for controlling charging of the battery 94. The charge control device 92 (charge control IC) can be formed of an integrated circuit device. It is possible to give a function of the charge control device 92 to the battery 94 as in a smart battery.

Next, an outline of operations of the power transmission side and the power reception side is described with reference to a flowchart in FIG. 4. In the power transmission side, when power is supplied by turning-on of the power source (step S1), the power transmission control device 20 performs temporary transmission of electric power for positional detection (step S2). By the transmission of electric power, the power source voltage at the power reception side rises, and then resetting of the power reception control device 50 is canceled (step S11). After that, in the power reception side, the signal P1Q is set to an "H" level (step S12). With the above processes, the transistor TB2 is turned off, and then the electric connection to the load 90 is shut off.

Next, in the power reception side, it is determined whether or not the positional relationship between the primary coil L1 and the secondary coil L2 is adequate (step S13) by using the position detection circuit 56. When it is determined that the positional relationship is adequate, the power reception control device 50 at the power reception side starts the authentication process of an ID to send an authentication frame to the power transmission side (step S14). To be specific, data of the authentication frame is transmitted by virtue of the load modulation described with reference to FIG. 3B.

When the power transmission control device 20 at the power transmission side receives the authentication frame, it performs a determination process for matching of the ID (step S3). When the power transmission control device 20 permits the authentication of the ID, it transmits a permission frame the power reception side (step S4). To be specific, data is transmitted by virtue of the frequency modulation described with reference to FIG. 3A.

When the power reception control device 50 receives the permission frame and confirms that the content is adequate, it transmits a start frame for starting the non-contact power transmission to the power transmission side (steps S15 and S16). On the other hand, when the power transmission control device 20 receives the start frame and confirms that the content is adequate, it starts the normal power transmission (steps S5 and S6). The power reception control device 50 sets the signal P1Q in an L level (step S17). Accordingly, as the transistor TB2 is turned on, the transmission of electric power to the load to the load 90 can be carried out, and then the supplying of the power (output of VOUT) to the load is started (step S18).

Figure 5:
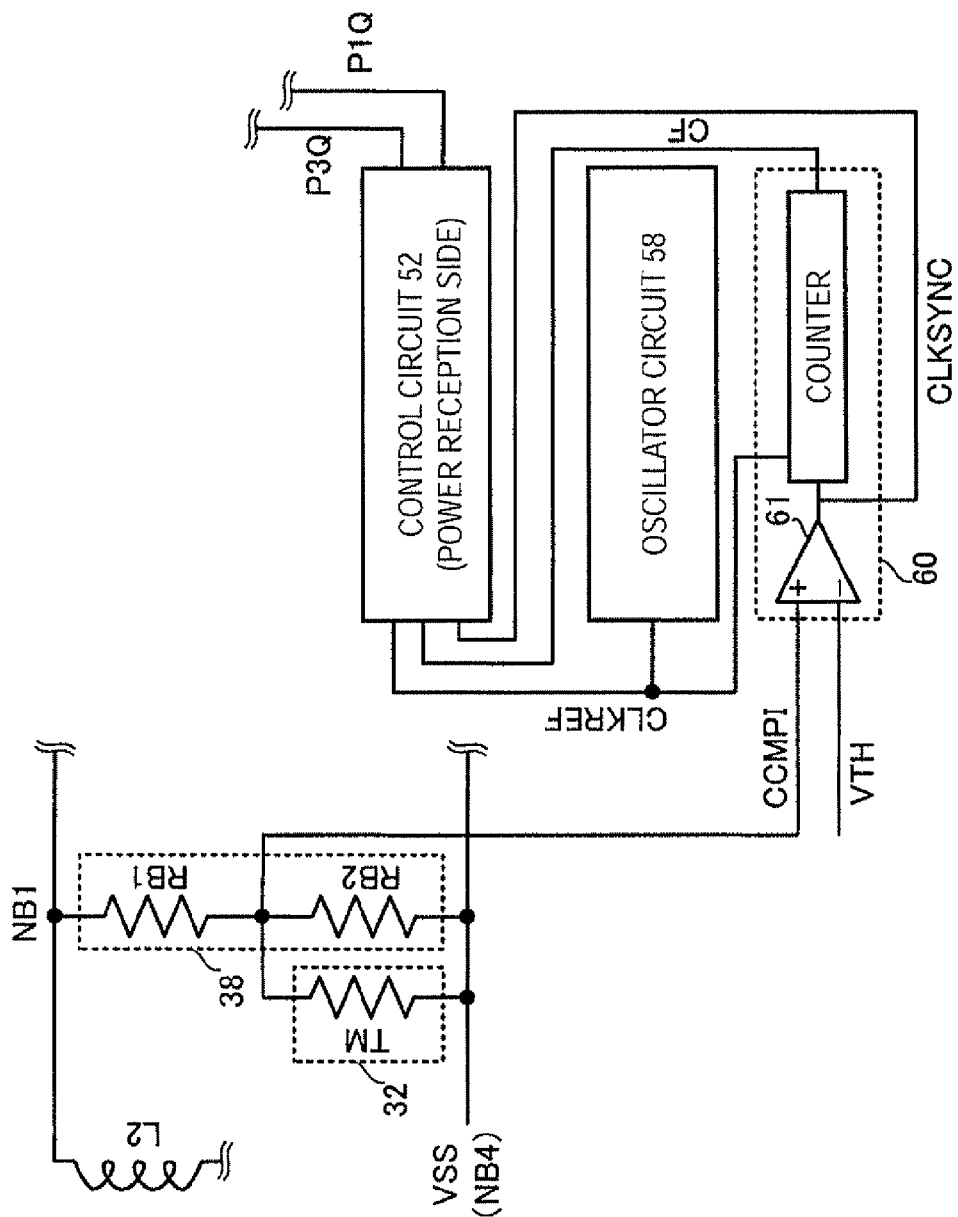
FIG. 5 is a block diagram showing exemplary structures of a voltage division circuit, a variable resistance element, a frequency detection circuit, and a power reception control device in the power reception device 40 shown in FIG. 2.

3. Voltage Division Circuit, Variable Resistance Element, Frequency Detection Circuit, and Power Reception Control Device:

FIG. 5 shows a voltage division circuit, a variable resistance element, the frequency detection circuit and the power reception control device in the power reception device 40 shown in FIG. 2. As shown in FIG. 5, a voltage division circuit 38 has the first resistance element RB1 and the second resistance element RB2 shown in FIG. 2. The voltage division circuit 38 is provided between one end side of the secondary coil L2 and a wire of the reference voltage VSS (voltage of node NB4). The first resistance element RB1 and the second resistance element RB2 are serially connected at a voltage division node. The first resistance element RB1 is connected to the node NB1 of the one end of the secondary coil L2 and the voltage division node. The second resistance element RB2 is connected to the voltage division node and the node NB4 of the reference voltage VSS. The voltage division circuit 38 outputs the voltage division signal CCMPI from the voltage division node. The AC induction voltage of the secondary coil L2 electromagnetically coupled to the primary coil L1 of the power transmission device 10 is reflected to the voltage of the voltage division signal CCMPI.

As shown in FIGS. 2 and 5, the variable resistance element 32 is connected to the second resistance element RB2 in parallel. The variable resistance element 32 is connected to the voltage division node and the node NB4 of the reference voltage VSS. The variable resistance element 32 is, for example, a thermistor, and the resistance thereof is varied in accordance with temperature of the variable resistance element 32. In FIGS. 2 and 5, the variable resistance element 32 is, for example, an NTC thermistor having a negative temperature coefficient. As a result, the more the temperature of the variable resistance element 32 increases, the more the resistance of the variable resistance element 32 decreases. Since the variable resistance element 32 is connected to the voltage division circuit, a voltage of the voltage division signal CCMPI is varied in accordance with the temperature of the variable resistance element 32.

The frequency detection circuit 60 shown in FIG. 2 includes, for example, a comparator circuit 61 that compares the voltage of the voltage division signal CCMPI with a given threshold voltage VTH, and a counter circuit that obtains a frequency CF of a synchronous clock CLKSYNC output from the comparator circuit 61 on the basis of a clock CLKREF at the secondary side output from the oscillation circuit 58.

FIG. 6A shows a waveform of the AC induction voltage signal of the secondary coil L2. FIG. 6B shows a waveform of the voltage division signal CCMPI. FIG. 6C shows a waveform of the synchronous clock CLKSYNC. In FIG. 6A, while the AC induction voltage of the secondary coil L2 is illustrated by an ideal sine wave, the actual signal includes noise. In addition, in FIGS. 6A and 6B, while a phase of the voltage division signal CCMPI is coincident with a phase of the AC induction voltage signal of the secondary coil L2, they can be actually different from each other.

The comparator circuit 61 generates a synchronous clock in synchronism with the frequency (f1 or f2) of the AC induction voltage of the secondary coil L2, i.e., the frequency (f1 or f2) of the voltage division signal CCMPI so that the synchronous clock CLKSYNC presents a high level while the voltage of the voltage division signal CCMPI is higher than the given threshold voltage VTH and the synchronous clock CLKSYNC presents a low level while the voltage of the voltage division signal CCMPI is lower than the given threshold voltage VTH. The counter circuit transmits a frequency CF of the synchronous clock CLKSYNC to the control circuit 52 in the power reception control device 50. Thus, the frequency detection circuit 60 detects the frequency (f1 or f2) of the voltage division signal CCMPI. The power reception control device 50 determines whether the transmission data from the power transmission device 10 is "1" or "0" on the basis of the frequency CF (f1 or f2) of the synchronous clock CLKSYNC as shown in FIG. 3A.

As described above, in a case where the power reception device 40 transmits desired data to the power transmission device 10, i.e., in the load modulation mode, the power reception control device 50 turns off the transistor TB2 of the power supply control section 48 based on the signal P1Q. The power reception control device 50 varies the load of the load modulation section (secondary side) 46 in accordance with the signal P3Q based on the transmission data to vary the signal waveform of the induction voltage of the primary coil L1 as shown in FIG. 3B.

To be specific, as shown in FIG. 5, the control circuit 52 of the power reception control device 50 generates transmission data based on the synchronous clock CLKSYNC output from the comparator circuit 61 by using the clock CLKREF at the secondary side output from the oscillation circuit 58. The transmission data is generally formed of a plurality of bits, and one bit in the transmission data is in synchronism with one clock of the synchronous clock CLKSYNC. The control circuit 52 of the power reception control device 50 generates the signal P3Q based on the transmission data having the plurality of bits so that the transistor TB3 is in an off-state when the one bit in the transmission data presents "0", and the transistor TB3 is in an on-state when the one bit in the transmission data presents "1".

Thus, the control circuit 52 of the power reception control device 50 varies a magnitude of the load of the power reception device in accordance with the synchronous clock CLKSYNC which is in synchronism with the frequency (f1 or f2) of the AC induction voltage of the secondary coil L2, i.e., the frequency (f1 or f2) of the voltage division signal CCMPI in the load modulation mode. In details, the control circuit 52 of the power reception control device 50 varies the magnitude of the load at the load modulation section 46 having a load modulation resistance element RB3 and a switching element TB3 which are serially connected to each other in the load modulation mode by turning on or off the switching element TB3 in accordance with the signal P3Q based on the transmission data.

Meanwhile, the power reception device 40 may be possibly overheated due to some abnormality. The inventors recognized that in such a case, it is effective to stop the transmission of electric power to the power reception device 40 from the power transmission device 40. To be specific, the inventors recognized that by adding the variable resistance element 32 to the power reception device 40, the transmission data to the power transmission device 10 from the power reception device 40 can be stopped. The operations of the non-contact power transmission system 10 and the power reception device 40 in abnormally high temperature are described below.

FIG. 6D shows a waveform of the voltage division signal CCMPI based on the variable resistance element 32 in abnormally high temperature. FIG. 6E shows a waveform of the synchronous clock CLKSYNC based on the variable resistance element 32 in abnormally high temperature.

While the power reception device 40 is overheated due to some abnormality, temperature of the variable resistance element 32 also increases. In FIG. 5, the variable resistance element 32 is, for example, an NTC thermistor having a negative temperature coefficient. Therefore, as shown in FIG. 6D, the voltage of the voltage division signal CCMPI is always lower than the given threshold voltage VTH so that the synchronous clock CLKSYNC always presents a low level as shown in FIG. 6E. When the temperature of the variable resistance element 32 is higher than given temperature, the synchronous clock CLKSYNC always presents a low level. Consequently, all of the bits of the transmission data based on the synchronous clock CLKSYNC present "0", respectively. As a result, the signal P3Q also always presents a low level and the transistor TB3 is always in an off-state. Thus, the control circuit 52 of the power reception control device 50 could not always vary the magnitude of the load of the power reception device (load at the load modulation section 46). In other word, the power reception device 40 is not able to transmit desired data to the power transmission device 10.

Figure 4:
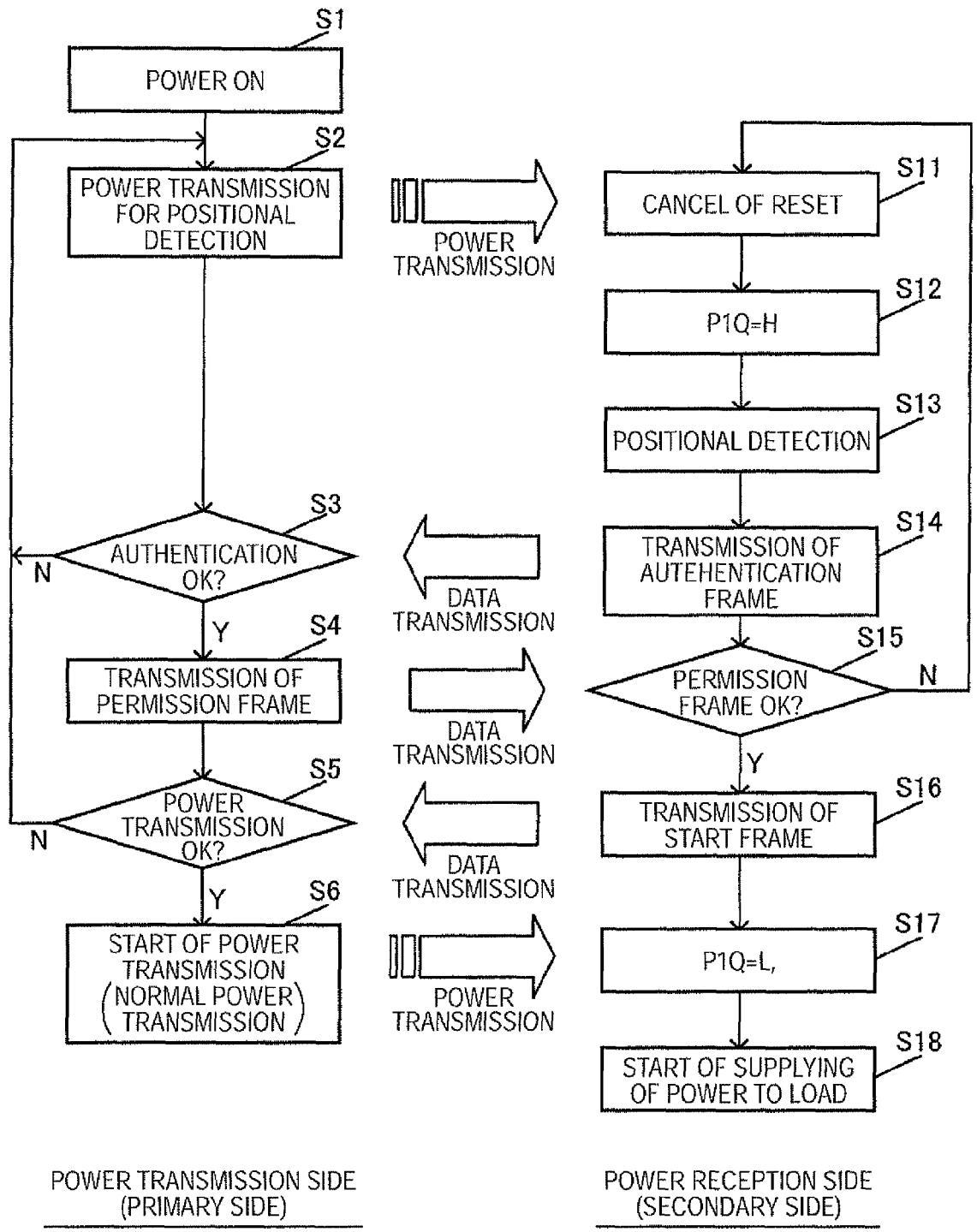
FIG. 4 is a flow chart for showing outlines of operations at a power transmission side and a power reception side.

For example, in a case where the power reception device 40 is not able to transmit an authentication frame as shown in step S14 in FIG. 4 to the power transmission device 10, the control circuit 22 of the power transmission control device 20 may repeat temporary transmission of electric power for positional detection (step S2). Since the power transmitted to the power reception device 40 is temporary power for positional detection, the power reception device 40 is not further heated. However, in a case where the control circuit 22 of the power transmission control device 20 does not receive the authentication frame even when a given time period has elapsed in step S4, the control circuit 22 stops the first and second power transmission drivers while controlling the driver control circuit 26. Thus, the power transmission control device 20 can stop the driving of the primary coil L1 when the magnitude of the load of the power reception device 40 is not varied beyond a given range.

In addition, in a case where the power reception device 40 is overheated due to some abnormality after the power reception device 40 transmits the authentication frame as shown in step S14 in FIG. 4 to the power transmission device 10, the power reception device 40, for example, is not able to transmit a start frame as shown in step S16 in FIG. 4 to the power transmission device 10. In the above case, the control circuit 22 of the power transmission control device 20 may repeat temporary transmission of electric power for positional detection (step S2). After that, or alternatively, the control circuit 22 of the power transmission control device 20 can stop the driving of the primary coil L1.

Figure 7:
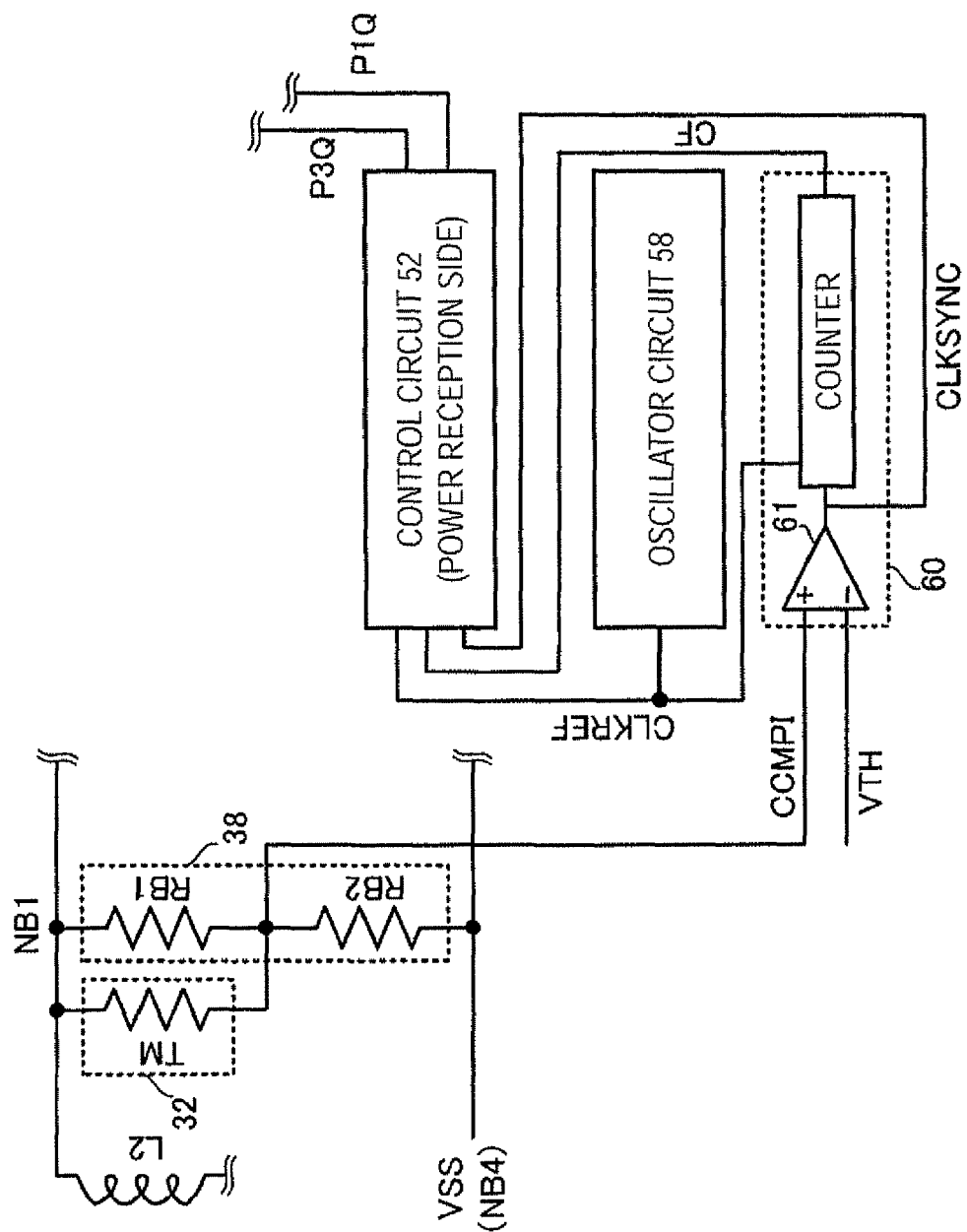
FIG. 7 is a block diagram showing a modification of the power transmission device 40 shown in FIG. 5.

FIG. 7 shows a modification of the power reception device 40 shown in FIG. 5. In FIG. 7, the variable resistance element 32 is connected to the first resistance element RB1 in parallel. The variable resistance element 32 is connected to the voltage division node and the node NB1 at one end of the secondary coil L2. In FIG. 7, the variable resistance element 32 is, for example, a PTC thermistor having a positive temperature coefficient. Consequently, the more the temperature of the variable resistance element 32 increases, the more the resistance of the variable resistance element 32 increases. As a result, the more the temperature of the variable resistance element 32 increases, the more the voltage of the voltage division signal CCMPI is lowered. Therefore, when the temperature of the variable resistance element 32 is higher than a given temperature, the synchronous clock CLKSYNC always presents a low level.

4. Detection of "Takeover" Condition

Figure 8:
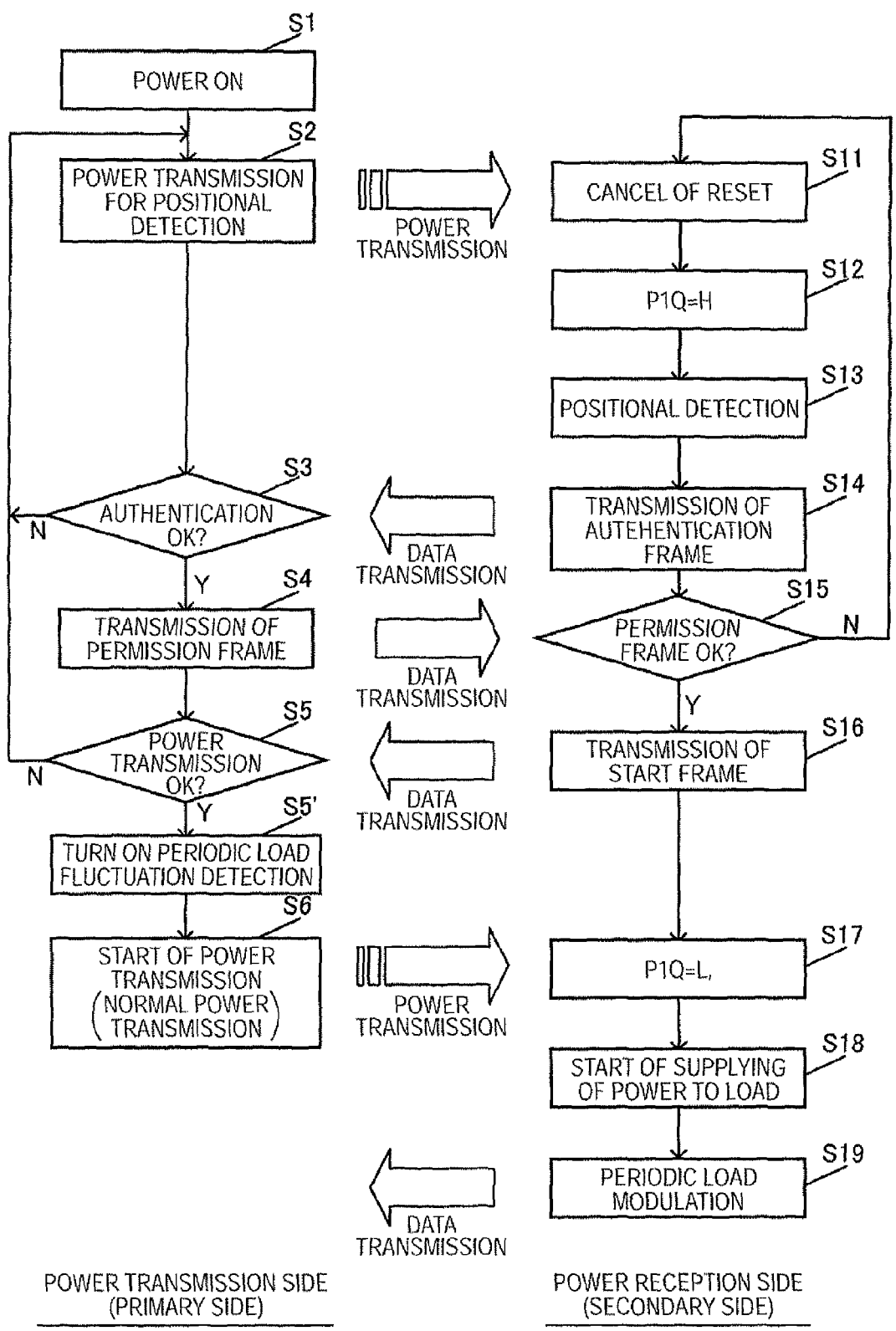
FIG. 8 is a modification of the flowchart shown in FIG. 4.

FIG. 8 shows a modification of the flowchart shown in FIG. 4. In FIG. 8, the power transmission control device 20 at the power transmission side activates detection of periodic load fluctuation (step S5'), before starting the normal transmission of electric power (step S6). In addition, the power reception control device 50 at the power reception side executes periodic load modulation, after starting supplying (output of VOUT) of power to the load (step S18). The detection of a "takeover" condition can be carried out depending on whether or not an intermittent (for example, periodic) load modulation signal at the power reception side can be detected at the power transmission side. When the "takeover" condition is detected, the control circuit 22 of the power transmission control device 20 can stop the driving of the primary coil L1.

The "takeover" condition is defined as a special state of interposition of a foreign object. Namely, it means that normal transmission of electric power is continued while erroneously recognizing that a foreign object is a device at the power reception side. For example, in a case where a thin metallic plate is inserted between the primary coil and the secondary coil so as to completely block the electromagnetic path between the coils, it could be recognized that a load having a certain degree is continuously placed when viewed from the power transmission side.

Figure 9:
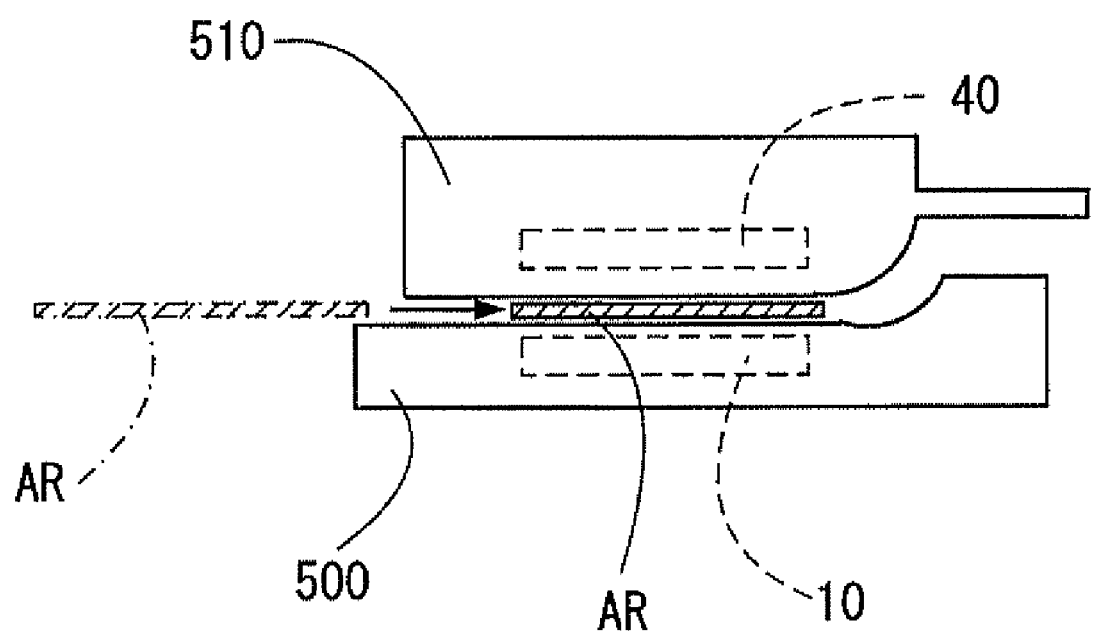
FIG. 9 is a cross sectional view illustrating an electronic apparatus forming a non-contact power transmission system for describing interposition of a foreign object ("takeover condition") after starting normal transmission of electric power.

FIG. 9 is a cross sectional view of an electronic apparatus forming a non-contact power transmission system for describing an inserted condition (takeover condition) of a foreign object after starting normal transmission of electric power. As shown in FIG. 9, in a case where, for example, a metallic foreign object (e.g., a thin metal plate) capable of blocking an electromagnetic path between a primary coil L1 and a secondary coil L2 is interposed between a power transmission device and a power reception device, transmission energy from a primary side is consumed by the metallic foreign object (that is, the metallic foreign object is the load). As a result, the power transmission device 10 recognizes that the load (the power reception device) is always placed at the power reception side. Therefore, even when the power reception device is, for example, removed, the transmission of electric power from the power transmission device 10 is continued so that the temperature of the metallic foreign object increases.

Thus, a phenomenon that the metallic foreign object takes a turn of the power reception device 510 to be a proper object in the nature is called as "takeover" in this description. In order to improve safety or reliability of the non-contact power transmission system to a practical level, it is necessary to take sufficient measures to a trouble of "heat by takeover". About placement of a foreign object, there is a possibility of an incidental or intentional case. When a foreign object capable of causing a "takeover" condition is placed, heat is generated so that burn injury, damage or breaking of a device may occur. Therefore, it is necessary to thoroughly take safety measures to placement of a foreign object. Then, a measure to heat due to "takeover" is specifically described below.

In normal transmission of electric power, a thin plate like metallic foreign object (conductive foreign object) AR is intentionally inserted between a cradle (charging device) 500 and a mobile phone 510. While the foreign object AR is interposed between them, most of the power to be supplied to the device at the secondary side (mobile phone 510) from the device at the primary side (cradle 500) is consumed by the foreign object AR (i.e., "takeover" of the transmitted power occurs) so that the foreign object AR may be heated. As a result, when a condition shown in FIG. 9 occurs, the power transmission device 10 built in the device at the primary side (cradle 500) may detect the interposition of the foreign object AR, and then the normal transmission of electric power should be immediately stopped.

For example, when the load of the power reception device is large, amplitude of a voltage induced on the primary coil L1 is increased and vice versa. When the rechargeable battery 94 of the mobile phone 510 is normally charged, the load of the reception device 40 should be gradually decreased with the lapse of time. If the load is suddenly increased, the sudden increase of the load can be detected because fluctuation of the load of the reception device 40 is monitored. However, it is impossible to determine whether the increase of the load is caused by the load itself (rechargeable battery 94 in the mobile phone), by positional deviation between the mobile phone 510 and the cradle 500, or by the interposition of the foreign object. As a result, it is impossible to detect the interposition of the foreign object by a method in which the transmission device 10 only detects the fluctuation of the load of the power reception device 40.

For this reason, in the invention, while the supplying of power to the load (rechargeable battery) is continued during the normal transmission of electric power, the power reception device 40 intermittently, intentionally varies the load viewed from the power transmission device 10 (periodic load modulation operation), and issues information to the power transmission device 10.

When the power transmission device 10 can detect the information by virtue of the intermittent fluctuation of the load at a predetermined timing, the following states described by items are confirmed.

(1) The device (mobile phone 510) at the power reception device 40 side is accurately set on the device (cradle 500) at the power transmission device 10 side.

(2) The device (mobile phone 510 including the rechargeable battery) at the power reception device 40 side adequately operates.

(3) A foreign object AR is not interposed.

When a foreign object AR is interposed during the normal transmission of electric power, the information issued from the reception device 40 does not reach the transmission device 10 by being blocked by the foreign object AR. That is, the transmission device 10 is not able to detect the intermittent variation of the load (e.g., periodic variation of the load) at the power reception device side. When the intermittent variation of the load is not detected after the states described in the above items (1) to (3) are confirmed, it is highly suspected that the above trouble is caused by a condition counter to the above described item (3). That is, it is possible to determine that the intermittent variation of the load is not detected by the interposition of the foreign object.

As the above described, when the temperature of the variable resistance element 32 is higher than a given level, the power reception device 40 is not able to transmit desired data to the power transmission device 10. That is, the power reception device 40 is not able to perform the periodic load modulation. As a result, even when interposition of a foreign object ("takeover" condition) is not actually made, the control circuit 22 of the power transmission control device 20 can stop the first and second transmission drivers by controlling the driver control circuit 26 by detecting the "takeover" condition. Thus, with the addition of the variable resistance element 32 to the power transmission device 40 and the above processes, the transmission control device 20 is configured so as to stop the driving of the primary coil L1.

Thus, with the above configuration, the non-contact power transmission of the invention is able to have an automatic stopping function for stopping the transmission of electric power by detecting a foreign object. However, it may be assumed that a quasi-power transmission device obtained by simulating the power transmission device 10 performs the transmission of electric power to the power reception device 40. In a case where the synchronous clock CLKSYNC always presents a low level, the power reception device 40 can allow the control circuit 52 of the power reception control device 50 to turn off the transistor TB2 of the power supply control section 48 based on the signal P1Q irrespective of the load modulation mode of the periodic load modulation. With the above configuration, the power transmission device 50 is able to stop the supplying of the power to the load of the power reception device, i.e., the real load 90.

5. Modification of Power Reception Device

Figure 10:
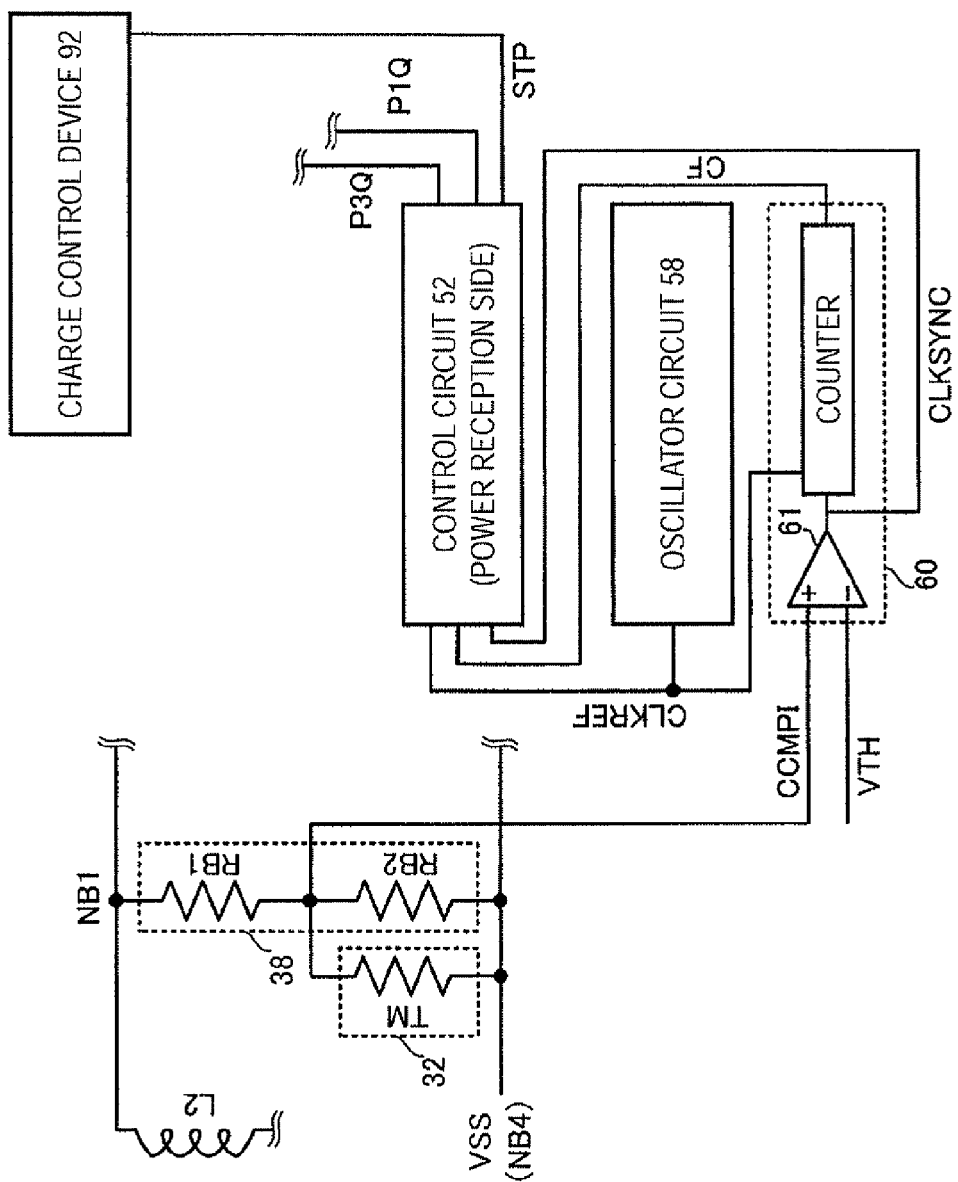
FIG. 10 is a block diagram showing another modification of the power reception device 40 shown in FIG. 5.

FIG. 10 shows another modification of the power reception device 40 shown in FIG. 5. It may be assumed that a quasi-power transmission device obtained by simulating the power transmission device 10 performs the transmission of electric power to the power reception device 40. In a case where the synchronous clock CLKSYNC always presents a low level, the power reception device 40 can allow the control circuit 52 of the power reception control device 50 to transmit a stop signal STP for stopping the charge control of the battery 94 to the charge control device 92 irrespective of the load modulation mode of the periodic load modulation. With the above configuration, the charge control device 92 can stop the supplying of the power to the battery 94.

Figure 11:
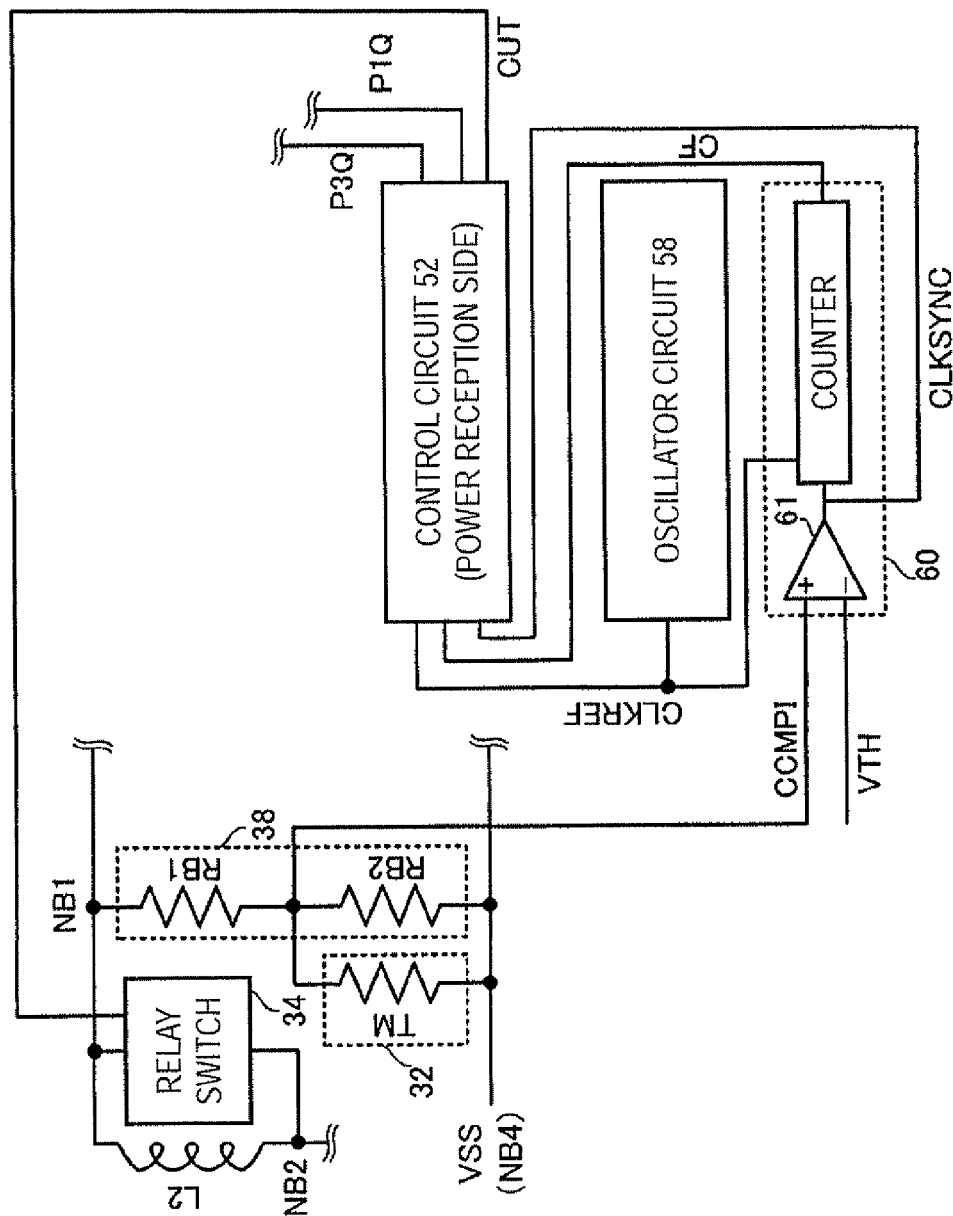
FIG. 11 is a block diagram showing further another modification of the power reception device 40 shown in FIG. 5.

FIG. 11 shows further another modification of the power reception device 40 shown in FIG. 5. In FIG. 11, the power reception device 40 may include a mechanical relay switch circuit 34 provided between one and the other ends of the secondary coil L2. The mechanical relay switch circuit 34 is connected to the nodes NB1 and NB2. In a case where the synchronous clock CLKSYNC always presents a low level, the power reception device 40 can allow the control circuit 52 of the power reception control device 50 to transmit a signal CUT for operating the mechanical relay switch circuit 34 to the mechanical relay switch circuit 34. With the above configuration, it is possible to make a short-circuit between one and the other ends of the secondary coil L2.

In a case where the synchronous clock CLKSYNC still presents a low level even when a given time period has elapsed after the control circuit 52 of the power reception control device 50 turns off the transistor TB2 of the power supply control section 48 based on the signal P1Q, the control circuit 52 may transmit the signal CUT to the mechanical relay switch circuit 34. In other word, the control circuit 52 of the power reception control device 50 may expect that the synchronous clock CLKSYNC properly functions during the given time period.

The power reception device 40 shown in FIG. 10 may include the mechanical relay switch circuit 34 shown in FIG. 11. In a case where the synchronous clock CLKSYNC always presents a low level, the power reception device 40 can allow the control circuit 52 of the power reception control device 50 to transmit the signal CUT to the mechanical relay switch circuit 34. In a case where the synchronous clock CLKSYNC still presents a low level even when a given time period has elapsed after the control circuit 52 of the power reception control device 50 transmits the stopping signal STP to the charge control device 92, the control circuit 52 can transmit the signal CUT to the mechanical relay switch circuit 34.

Figure 12:
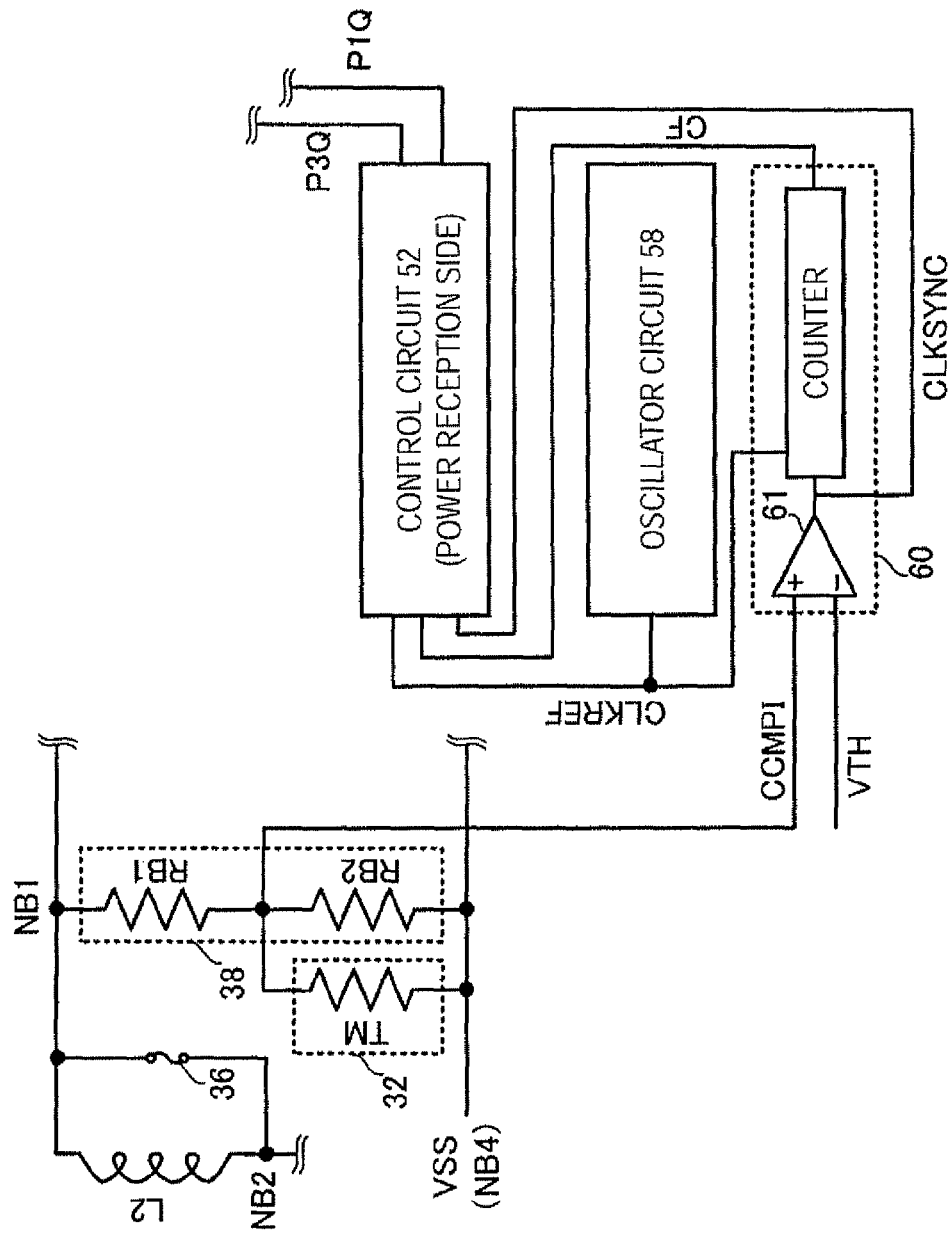
FIG. 12 is a block diagram showing further another modification of the power reception device 40 shown in FIG. 5.

FIG. 12 shows further another modification of the power reception device 40 shown in FIG. 5. In FIG. 12, the power reception device 40 may include a fuse element 36 provided between one and the other ends of the secondary coil L2. The fuse element 36 is connected to the nodes NB1 and NB2. When an excessive current flows in the fuse element 36, the fuse element 36 can make a short circuit between one and the other ends of the secondary coil L2. The fuse element 36 can be simply provided between the secondary coil L2 and the load of the power reception device 40. The power reception device 40 shown in FIG. 10 may include a fuse element similar to the above. Further, the power reception device 40 shown in FIG. 11 may include a fuse element similar to the above.

It should be understood by those skilled in the art that the embodiments of the invention may be changed or modified without departing from the spirit and scope of the invention (by referencing common technical knowledge in some cases). The scope of the invention includes a part of or all of the embodiments and those modifications, and the scope is defined by the appended claims and their equivalents.

What is claimed is:

1. A power reception device, comprising:
   a first resistance element having one end electrically connected to one end of a secondary coil capable of being electromagnetically coupled to a primary coil of a power transmission device;
   a second resistance element having one end electrically connected to an other end of the first resistance element and having an other end being supplied with a reference voltage; and
   a power reception control device that obtains a frequency of an alternating current (AC) voltage induced in the secondary coil based on a voltage division signal output from the other end of the first resistance element, and that varies a magnitude of a load of the power reception device in accordance with the frequency,
   a variable resistance element that varies a resistance in accordance with temperature being connected in parallel to the first resistance element or the second resistance element.

2. The power reception device according to claim 1, the variable resistance element having a negative temperature coefficient, is the variable resistance element being connected to the second resistance element in parallel.

3. The power reception device according to claim 1, the variable resistance element having a positive temperature coefficient, the variable resistance element being connected to the first resistance element in parallel.

4. The power reception device according to claim 1, the power reception control device having a comparator circuit that compares a voltage of the voltage division signal with a given threshold voltage, and that generates a synchronous clock such that the synchronous clock presents a high level while the voltage of the voltage division signal is higher than the given threshold voltage and presents a low level while the voltage of the voltage division signal is lower than the given threshold voltage, and the power reception control device varies the magnitude of the load of the power reception device in accordance with the synchronous clock.

5. The power reception device according to claim 4, the synchronous clock always presenting a low level when the temperature of the variable resistance element is higher than a predetermined temperature, and the power reception control device being not able to vary the magnitude of the load of the power reception device at all.

6. The power reception device according to claim 5, wherein when the synchronous clock always presents a low level, the power reception control device stops supplying of power to the load of the power reception device.

7. The power reception device according to claim 5, the load of the power reception device including a battery, and a charge control device that performs control of charging of the battery,
   the power reception control device transmitting a stop signal that stops the control of charging of the charge control device to the charge control device.

8. The power reception device according to claim 6, further comprising:
   a mechanical relay switch circuit provided between the one end of the secondary coil and an other end of the secondary coil,
   the power reception control device controlling the mechanical relay switch circuit so as to make a short circuit between the one end of the secondary coil and the other end of the secondary coil after the power reception control device stops supplying of power to the load of the power reception device or after the power reception control device transmits the signal to the charge control device.

9. The power reception device according to claim 1, further comprising:
   a fuse element provided between the secondary coil and the load of the power reception device.

10. The power reception device according to claim 1, further comprising:

a rectification circuit that converts an alternating current (AC) voltage induced on the secondary coil to a direct current (DC) voltage, and that has a first input terminal, a second input terminal, a first output terminal, and a second output terminal, the first input terminal being connected to the one end of the secondary coil, the second input terminal being connected to an other end of the secondary coil, the secondary output terminal being supplied with the reference voltage, and a difference between a potential of the first output terminal and a potential of the second output terminal presenting the DC voltage.

11. The power reception device according to claim 1, further comprising:

a load modulation section having a load modulation resistance element and a switching element, the load modulation resistance element and the switching element being serially connected to each other, the power reception control device controlling the switching element to vary the magnitude of the load of the power reception device.

12. An electronic apparatus, comprising:

the power reception device according to claim 1.

13. A non-contact power transmission system, comprising:

the power reception device according to claim 1; and the power transmission device according to claim 1, the transmission device having the primary coil, and a transmission control circuit that stops driving of the primary coil when the transmission device detects that the magnitude of the load of the power reception device is less than a given range.

14. A power transmission device that performs transmission of electric power to the power reception device according to claim 1, comprising:

a transmission control circuit that stops driving of the primary coil when a magnitude of the power reception device is less than a given range.

* * * * *